US 11,305,945 B2

(12) United States Patent
Stiegler et al.

(10) Patent No.: US 11,305,945 B2
(45) Date of Patent: Apr. 19, 2022

(54) CONTINUOUSLY CIRCULATING CONTAINER CONVEYOR DEVICE IN A PACKAGING MACHINE

(71) Applicant: ERCA S.A.S., Les Ulis (FR)

(72) Inventors: Achim Stiegler, Crailsheim (DE); Marcel Pilat, Ilshofen (DE); Moritz Glück, Weilheim (DE); Timo Graf, Berglen (DE); Daniel Kurr, Gerabronn (DE); Daniel Vaas, Dinkelsbühl (DE)

(73) Assignee: ERCA S.A.S.

( * ) Notice: Subject to any disclaimer, the term of this patent is extended or adjusted under 35 U.S.C. 154(b) by 0 days.

(21) Appl. No.: 16/982,116

(22) PCT Filed: Mar. 20, 2019

(86) PCT No.: PCT/EP2019/000085
§ 371 (c)(1),
(2) Date: Sep. 18, 2020

(87) PCT Pub. No.: WO2019/179657
PCT Pub. Date: Sep. 26, 2019

(65) Prior Publication Data
US 2021/0024295 A1 Jan. 28, 2021

(30) Foreign Application Priority Data
Mar. 20, 2018 (DE) .......................... 102018002280.4

(51) Int. Cl.
*B65G 35/06* (2006.01)
*B65B 3/04* (2006.01)
(Continued)

(52) U.S. Cl.
CPC .............. *B65G 35/066* (2013.01); *B65B 3/04* (2013.01); *B65G 33/06* (2013.01); *B65G 37/005* (2013.01); *B65G 47/846* (2013.01)

(58) Field of Classification Search
CPC ........ B65G 33/02; B65G 33/04; B65G 33/06; B65G 35/066; B65G 37/005
See application file for complete search history.

(56) References Cited

U.S. PATENT DOCUMENTS 5,899,319 A * 5/1999 Jarnagin ................ B65G 33/32
198/666
6,082,256 A 7/2000 Hellmeier et al.
(Continued)

FOREIGN PATENT DOCUMENTS

DE 4216671 A1 9/1993
EP 0089543 A1 7/1983
(Continued)

OTHER PUBLICATIONS

Haaken, Willy—International Search Report dated Sep. 26, 2019.
(Continued)

*Primary Examiner* — William R Harp
(74) *Attorney, Agent, or Firm* — Eversheds Sutherland (US) LLP

(57) ABSTRACT

The invention relates to a container conveyor device (10) in a packaging machine having a container carrier (13) with a plurality of container receptacles (15). At least two rotary-driven linear conveyors (11, 28) are provided, and the container carrier (13) has at least one engagement part (14) which can be brought into engagement with the linear conveyors (11, 28). Two curved conveyors (20, 34) each have a curved guide track (21, 35) with which at least one projection of the container carrier (13) can be brought into engagement. A plurality of container carriers (13) can be transported along the upper linear conveyor (11) in a row with a mutual first spacing of less than 30 mm and at an average speed V0. The container carriers can be transported along the lower linear conveyor (28) with a mutual second (Continued)

Figure 1:
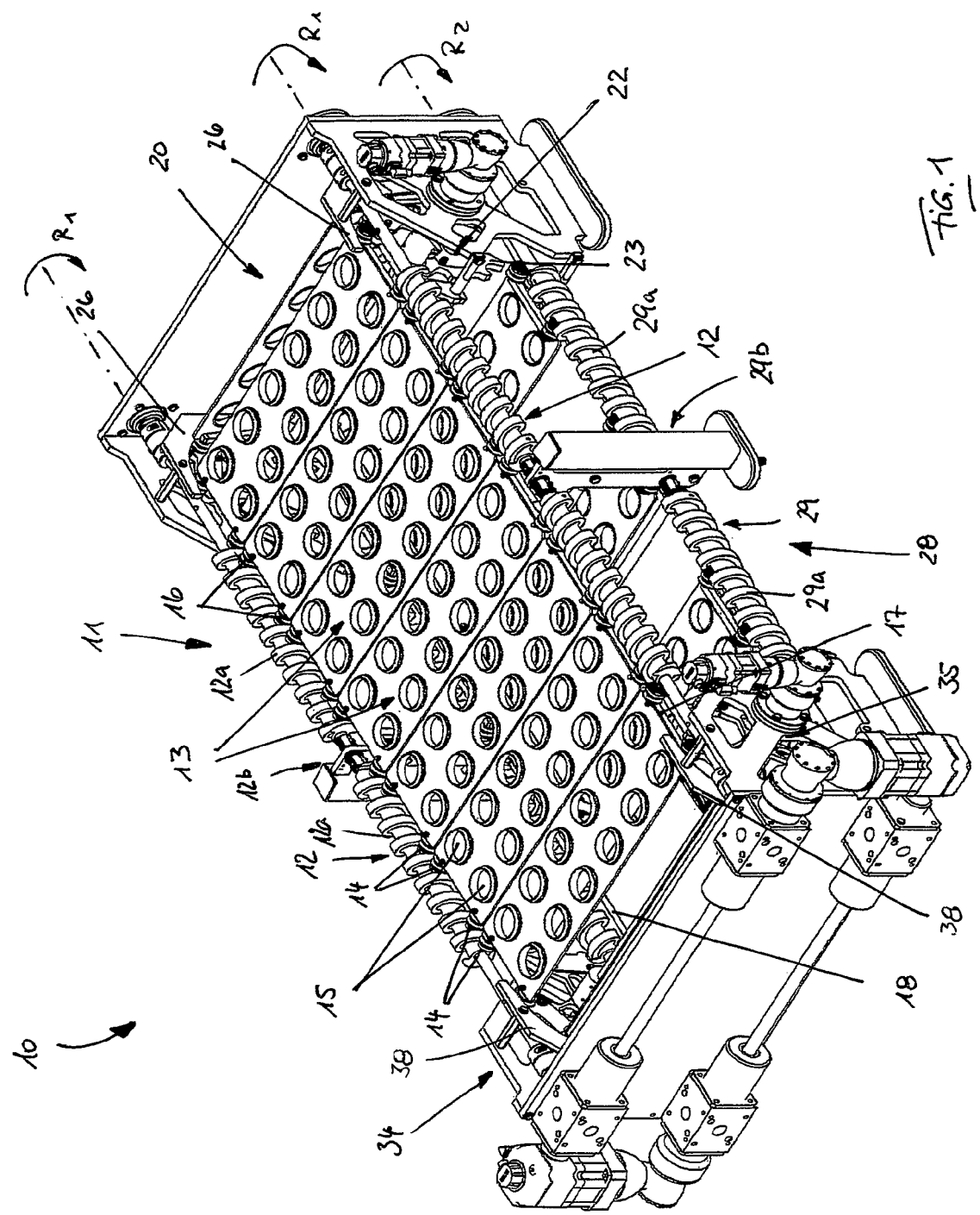

spacing which is greater than the first spacing and at an average speed Vu, where $V_u \geq 1.5\ V_0$.

15 Claims, 8 Drawing Sheets

(51) Int. Cl.
    *B65G 33/06*     (2006.01)
    *B65G 37/00*     (2006.01)
    *B65G 47/84*     (2006.01)

(56) References Cited

U.S. PATENT DOCUMENTS

| | | | |
|---|---|---|---|
| 6,148,721 A * | 11/2000 | Hellmeier | B41F 15/20 101/35 |
| 6,398,538 B1 * | 6/2002 | Padovani | B65G 33/04 198/465.1 |
| 6,823,781 B2 * | 11/2004 | Tweedy | B41F 15/0872 101/40.1 |
| 2009/0321220 A1 | 12/2009 | Ewerlof | |

FOREIGN PATENT DOCUMENTS

| | | |
|---|---|---|
| EP | 0089543 A1 | 9/1983 |
| EP | 0995700 A1 | 4/2000 |

OTHER PUBLICATIONS

Haaken, Willy—Written Opinion dated Sep. 26, 2019.
Search Report and Written Opinion issued in Germany, dated Jan. 1, 2019.

* cited by examiner

CONTINUOUSLY CIRCULATING CONTAINER CONVEYOR DEVICE IN A PACKAGING MACHINE

CROSS-REFERENCE TO RELATED APPLICATIONS

This application is a National Stage of International Application No. PCT/EP2019/000085, filed Mar. 20, 2019, which claims priority to German patent application 10 2018 002 280.4, filed Mar. 20, 2018, each of which is hereby incorporated by reference.

The invention relates to a continuously circulating container conveyor device in a packaging machine, in particular a cup filling machine, and a packaging machine with a corresponding container conveyor device.

In the following, by way of example a cup filling machine is assumed as the packaging machine, however, the invention is not restricted to this example.

In a cup filling machine, several empty cups, typically made of plastic, are inserted into a container receptacle, i.e., a so-called cell plate, and transported with the container receptacle through various work stations of the cup filling machine. The work stations can be, in particular, a sterilization station, a filling station, a sealing station or a removal station.

Several container receptacles are provided, which are mounted on a continuously circulating conveyor device in the form of a pair of chains arranged in parallel. As long as the container receptacle is on the upper run of the conveyor device, it will be guided through the work stations of the cup filling machine. At the end of the upper run of the conveyor device the cups are removed from the container receptacle and the container receptacle is conducted in particular via a chain wheel by 180° to the lower run and guided along the lower run to the opposite end of the conveyor device and then brought back to the upper run by means of a chain wheel.

A corresponding circulating conveyor device in the form of circulating chains has been known for a long time, however is associated with some disadvantages. In particular, it is disadvantageous that there is a little play between individual chain links, which however adds up over the length of the chain and hence leads to imprecise conveyor movements. Furthermore, the chain wears out over the course of a long operating time, as a result of which it extends, so that the position of the conveyor device to the individual work stations must be adjusted and readjusted repeatedly, which on the one hand is time-consuming and expensive, and on the other hand, has the disadvantage that the cup filling machine is inactive during this time.

In using a chain, the container carriers are arranged in continuous series over the entire course of the chain with equal mutual spacing. Since, in the region of the upper run, in which the handling or filling of the cups inserted into the container carriers occurs, an as continuous as possible narrow cup sequence and hence container carrier series must exist, the container carriers are arranged over the entire length of the chain in narrow sequence, although a correspondingly narrow sequence is only necessary in the region of the upper run. In this way a great number of container carriers are provided, of which always only a small proportion are simultaneously filled with cups. As a result, the cup conveyor device is relatively cost-intensive.

The invention addresses the question of creating a continuously circulating container conveyor device in a packaging machine in which the number of container carriers can be optimized.

This problem is solved by a container conveyor device as described herein.

In accordance with the invention, it proceeds from the rationale of dividing the conventional circulating chain into several individual conveyors which in cooperation with one another, recreate the transport movement of a continuously circulating chain. In the process, at least two linear conveyors respectively in the form of at least one rotary driven screw conveyor are provided. The container carrier has at least one engagement part, which can be brought into engagement with the screw conveyors for the transfer of a drive movement. When the screw conveyor is rotated, the rotational movement via the engagement of the engagement part leads to a linear displacement of the container carrier.

In addition, at least two curve conveyors are provided, which each have a curved guide track. At least one projection of the container carrier can be brought into engagement with the curved guide track, so that the container conveyor is securely guided along the guide track during the curved transport movement.

For the drive movement along the curved guide track each curved conveyor is assigned a rotating drive device, which has at least one receptacle, which can be brought into engagement with the container carrier, so that the drive movement can be transferred from the drive device to the container carrier.

To reproduce the continuously circulating conveyor device provision is made that a respective one of the curved conveyors is arranged in transport direction between the two linear conveyors, i.e. the linear conveyors and the curved conveyors are preferably in alternating arrangement. In the process, provision is made in particular that the linear conveyors are arranged on top of one another with spacing and that the end regions of the linear conveyors are each connected to one another via a curved conveyor.

Due to the division of the continuously circulating transport track in the linear conveyors and curved conveyors, on the one hand the disadvantages of the elongation of a chain occurring as a result of wear are prevented, on the other hand, it is possible to ensure a precise transport movement over a longer period of operation. In case one of the conveyors has to be replaced, this can be accomplished quickly and easily via corresponding exchangeable modules.

In the operation of the container conveyor device, due to the rotation of the screw conveyor, the container carrier runs along the for example upper linear conveyor. At the end of the screw conveyor of the linear conveyor, the engagement part of the container carrier is disengaged from the screw conveyor and simultaneously brought into engagement with the rotating drive device of the curved conveyor that follows in transport direction, so that, due to the drive movement of the rotating drive device, the container carrier is then moved along the curved conveyor. In the process, the drive movements of the screw conveyor and the rotating drive device are synchronized.

At the end of the curved conveyor the container carrier is disengaged from the rotating drive device of the curved conveyor and simultaneously with its engagement part brought into engagement with the screw conveyor of the lower linear conveyor, so that the container carrier is subsequently moved along the lower linear conveyor. At the end of the lower linear conveyor this container carrier changes to the second curved conveyor in the mentioned manner and is moved by the corresponding rotating drive device along the curved conveyor and at the end of the movement is transferred back to the screw conveyor of the upper linear conveyor. In this way the linear conveyors and the curved conveyors form a circulating transport track, which preferably is formed by two linear conveyors arranged on top of one another at a spacing from each other and curved conveyors arranged at the end of the linear conveyors, which divert the container carrier by 180°.

Along the upper linear conveyor, i.e. in the region of the upper run, a plurality of container carriers can be transported in a series with a mutual $1^{st}$ spacing of less than 30 mm and at an average speed $V_o$. Successive container carriers can also be in mutual contact, so that a closed series is formed. Preferably, between successive container carriers a smaller spacing of less than 10 mm is provided. In this way it is ensured that the work stations arranged in the region of the upper run or of the upper linear conveyor can continuously process and in particular, fill and seal the cups and containers received in the container carriers.

After a container carrier is relocated to the lower linear conveyor by means of the curved conveyor arranged on the end of the upper linear conveyor, the container carrier is transported at an average speed $V_u$, which is greater than the speed $V_o$ of the transport along the upper linear conveyor, where $V_u \geq 1.5\ V_o$ and in particular $V_u \geq 2.5\ V_o$. During the transport along the lower linear conveyor the container carriers are hence transported at a mutual $2^{nd}$ spacing, which is greater than the $1^{st}$ spacing. In this way, the number of necessary container carriers that one needs to ensure a continuous series of container carriers in the region of the upper run is reduced.

Preferably, the two linear conveyors are substantially structurally identical, as a result of which the production of the container conveyor device is simplified.

In a preferred embodiment of the invention, provision is made that the linear conveyor has two screw conveyors arranged next to each other in parallel at a spacing. The screw conveyors can be horizontally aligned and are each rotatable around their longitudinal axis. The rotational movement of the screw conveyors is synchronized and can occur in the same direction or in opposite directions.

In a preferred embodiment of the invention, provision is made that at least one of the screw conveyors and preferably all screw conveyors are formed from several screw conveyor parts arranged axially behind one another and connected to one another in rotationally fixed manner. The connection of the screw conveyor parts can take place by means of clamping, latching or screwing, so that individual screw conveyor parts can, if necessary, be easily removed and replaced. The connection of the screw conveyor parts in a unitary screw conveyor has the advantage that only one drive device is necessary for the screw conveyor.

The preferably plate-shaped container carrier is arranged between the screw conveyors, said container carrier bridging the distance between the screw conveyors and carrying the respective engagement part on the front sides facing the screw conveyors, said engagement part engaging between the windings of the screw conveyors, so that during their rotational movement an axial transport movement is transferred to the container carrier.

In further development, provision can be made that a rail is assigned to each screw conveyor, upon which the container carrier can be moved. To this end, the container carrier can have a plurality and in particular in each case two rollers on its front sides facing the screw conveyors, said rollers being spaced apart in transport direction and with which it is moveably supported on the rails. The rails hence receive the weight of the container carrier and if applicable, of the inserted cups and divert it. In this way the screw conveyors can serve solely for the transfer of the transport movement to the container carrier.

In case the distance between the screw conveyors is relatively great, a further central rail can be formed in the central region of the intermediate space formed between the screw conveyors, upon which the container carrier is additionally supported. In this way a sagging of the container carrier can at least be prevented to the greatest possible extent, even in the case of relatively large containers and heavy products.

The two curved conveyors are preferably structurally identical, whereby the construction is simplified. In a preferred embodiment of the invention provision is made that the curved conveyor has two guide carriers arranged at a distance next to each other, at which a respective curved guide track preferably circulating by 180° is embodied. The two guide tracks ensure that the container carrier is securely guided during its movement along the curved conveyors.

The rollers, via which the container carrier supports itself on the rails, each carry preferably one of the engagement parts in particular in the form of an engagement roller preferably arranged coaxially to the roller. In this way, it is accomplished that each container carrier is supported on its front sides via two rollers spaced apart in transport direction on the rails and additionally is in engagement with the linear conveyors via two engagement parts or engagement rollers spaced apart from each other in transport direction. The combination of the rollers and the engagement parts in a common modular unit or even in a common component leads to a compact, functionally safe construction.

The rotating drive device, which preferably applies a drive force to both guide carriers on the container carrier, is provided for the curved conveyor. The rotating drive device of the curved conveyor can have two rotary driven rotors arranged next to each other at a distance, which each have several rotor arms arranged distributed over the circumference. In the process, a rotor can be assigned to each guide carrier. Preferably, the rotors are mounted on a common, rotary driven axis, however a separate drive can also be provided for each rotor. The drive can work continuously or also discontinuously, i.e. following an uneven path-time movement curve.

The rotor preferably has a central hub, from which the rotor arms extend radially outward and project freely. At least one receptacle opening radially outward can be assigned to each rotor arm. The receptacle can be brought into engagement with the engagement part of the container carrier when the container carrier is transferred from the linear conveyor to the curved conveyor. Preferably, the coupling part is arranged on the radially outer free end of each respective rotor arm.

When the container carrier is moved along the linear conveyor and reaches its end, the engagement part of the container carrier advancing in transport direction first engages in one of the receptacles of the rotor arms of the rotor, so that the container carrier is taken over in its segment advancing in transport direction by the curved conveyor. Simultaneously, the engagement part which precedes in the transport direction is released from the screw conveyor. With a further transport movement the engagement part trailing in transport direction also engages in one of the receptacles of the rotor arms of the rotor, so that the further movement of the container carrier occurs solely by the rotation of the rotor, which is transferred via the rotor arm and the receptacle to the container carrier. In the process, the drive movements of the screw container and of the rotor are synchronized.

At the end of the curved conveyor a corresponding inverse transfer of the container part to the other linear conveyor occurs. In this way a continuously circulating container conveyor device is present in which a movement of the container carrier can be achieved with high precision.

The invention also comprises a packaging machine with a continuously circulating container conveyor device according to the preceding description, wherein the packaging machine is preferably a cup filling machine.

Figure 2:
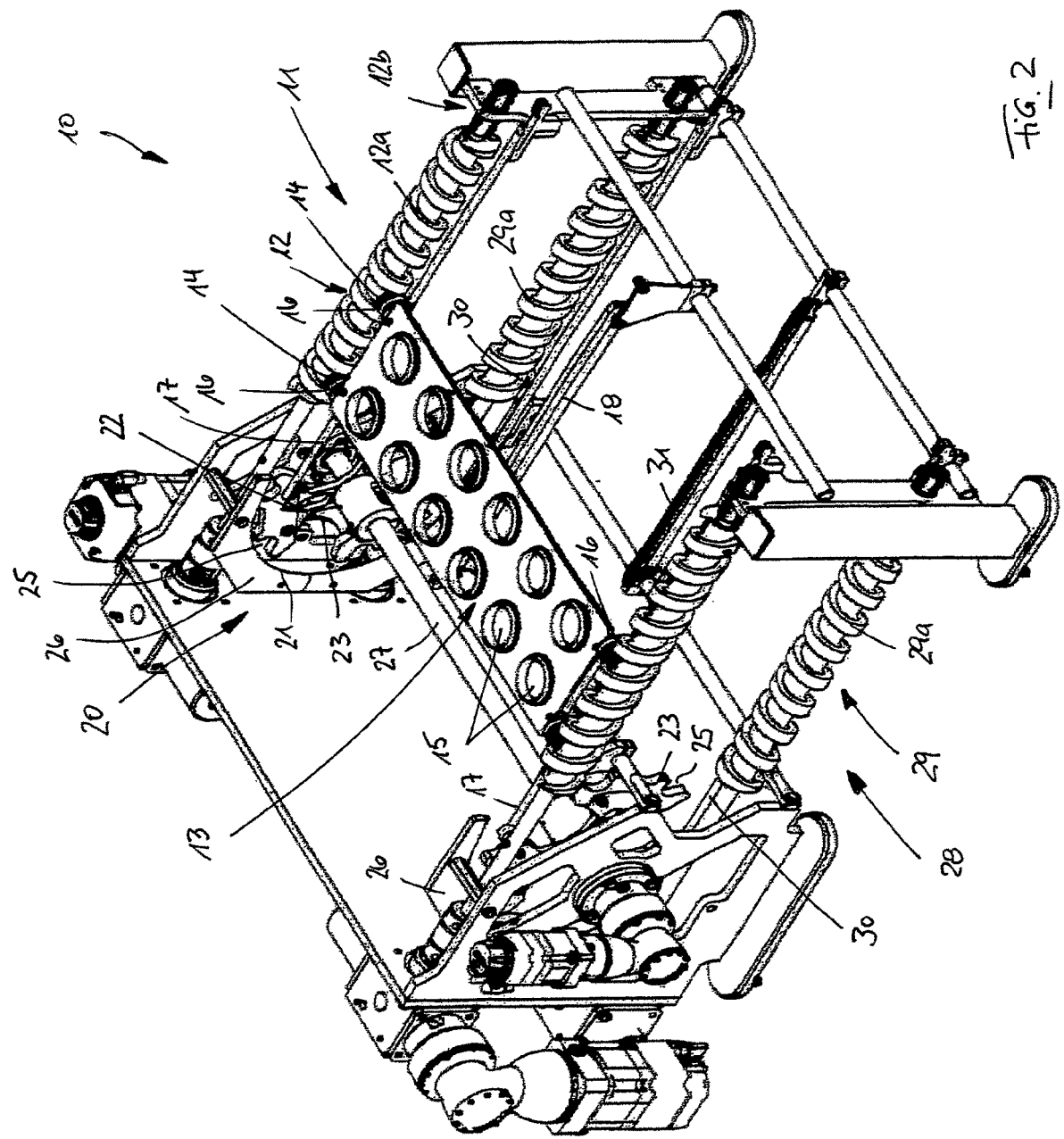
Figure 3:
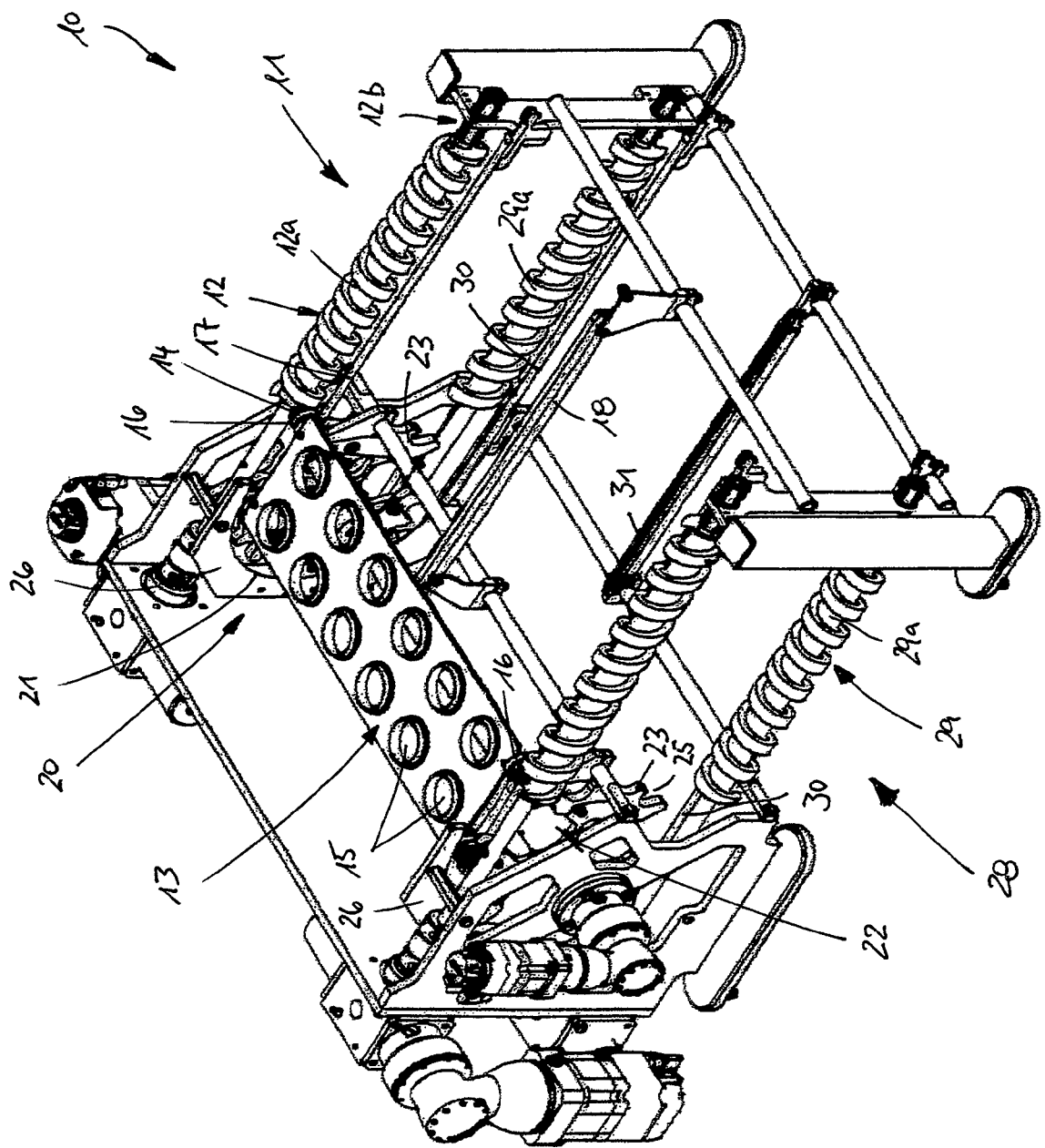
Figure 4:
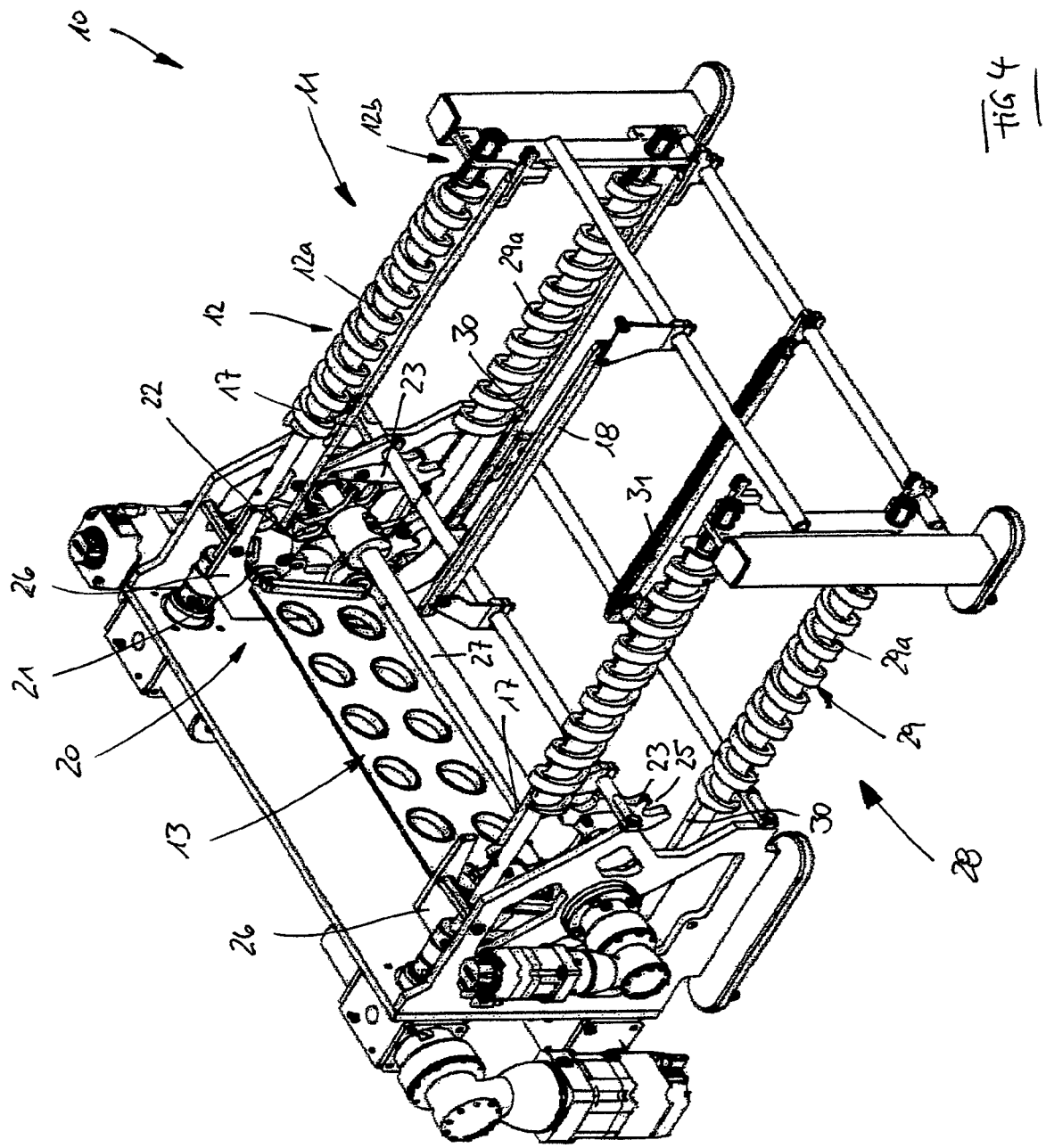
Figure 5:
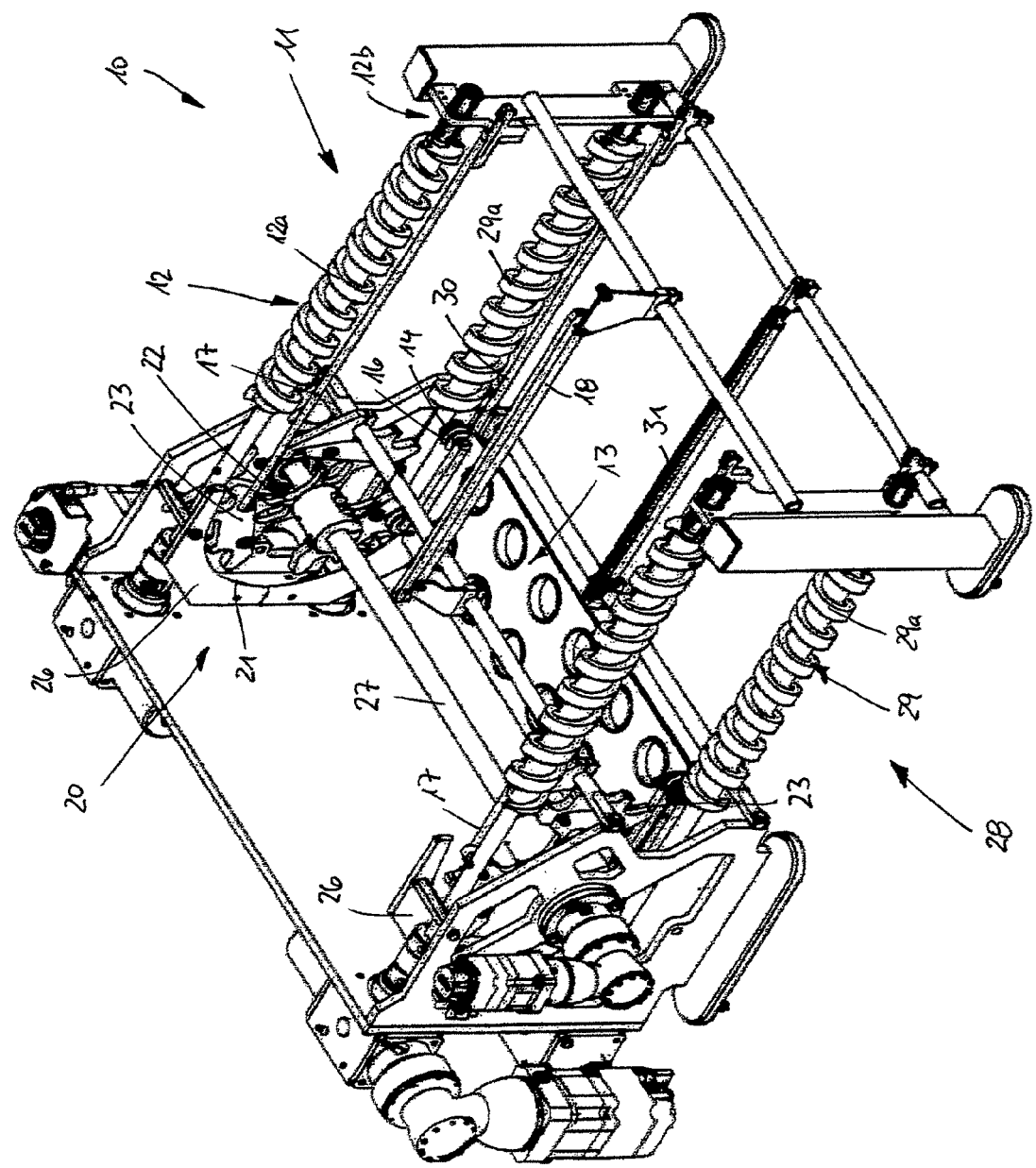
Figure 6:
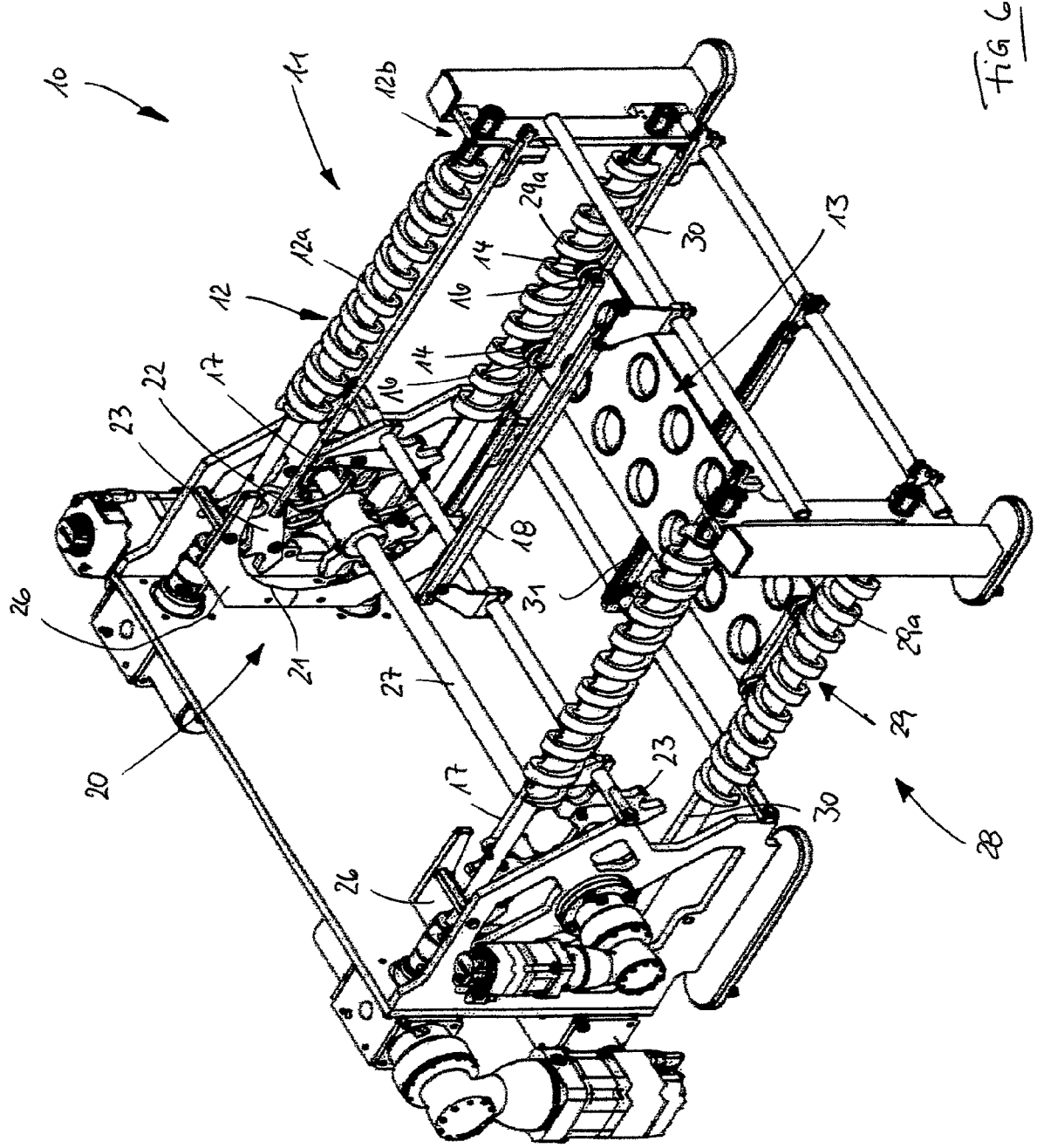
Figure 7:
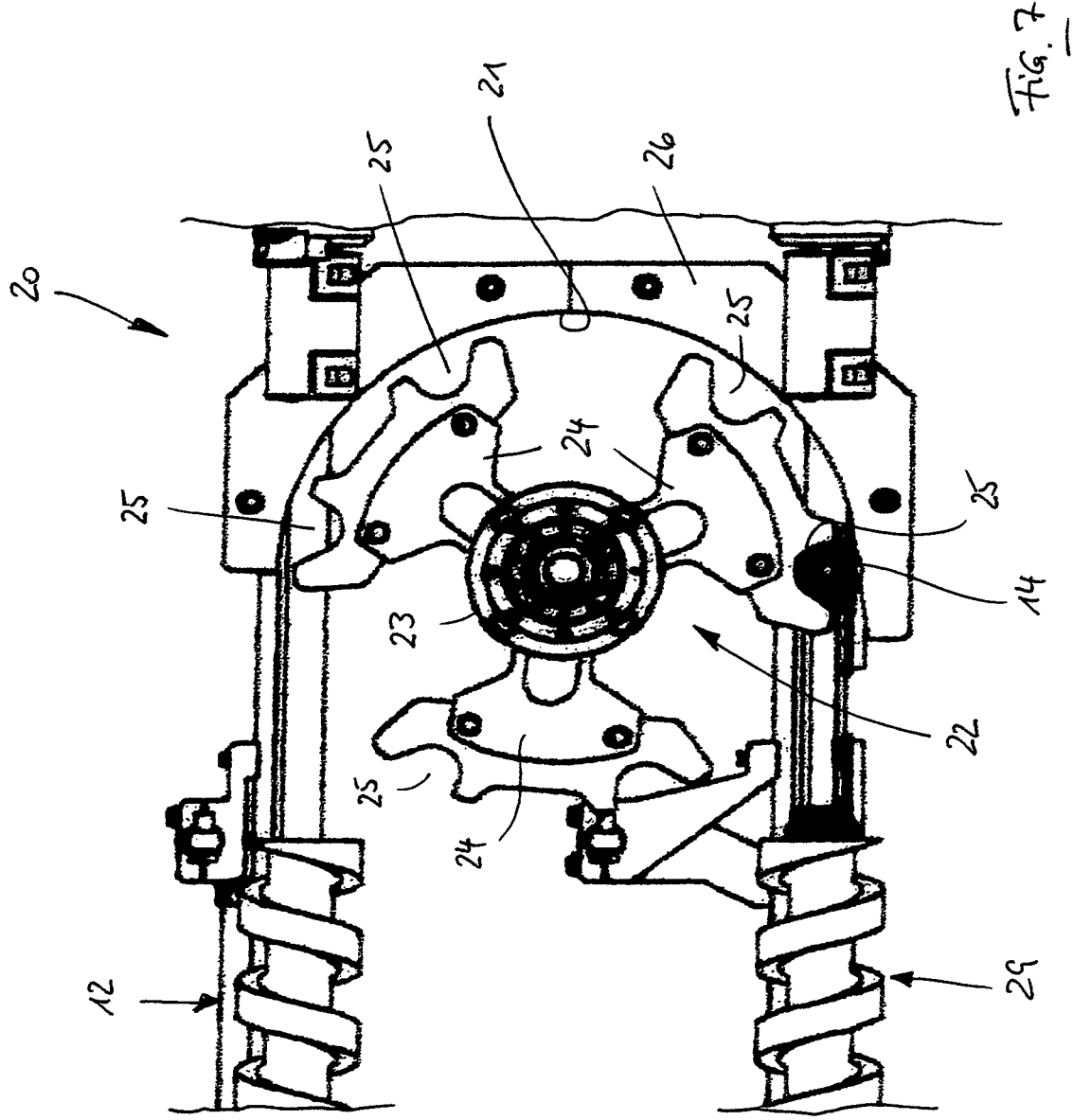
Figure 8:
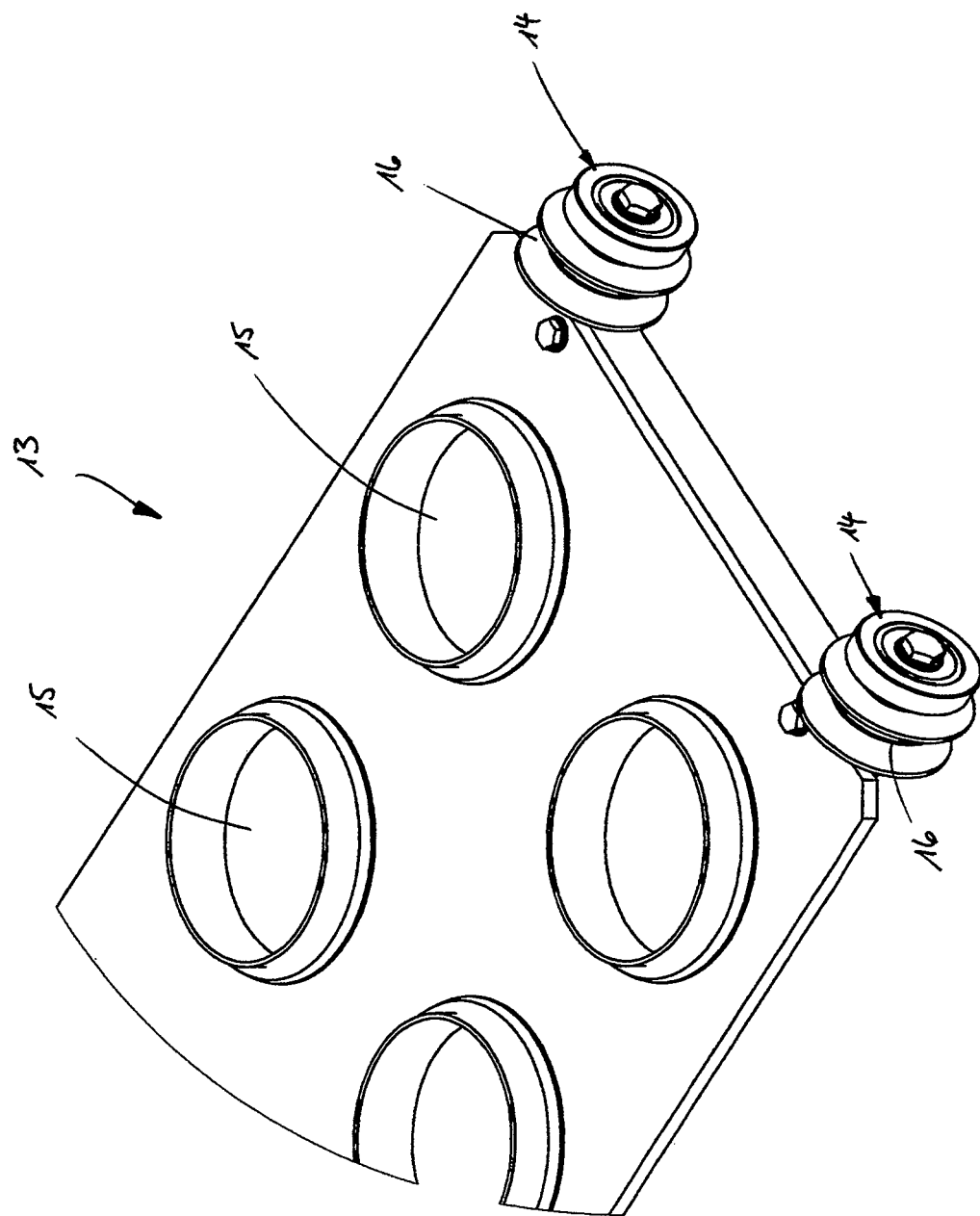

Further particulars and features of the invention appear from the following description of an exemplary embodiment referring to the drawing. The figures show the following:

FIG. 1 a perspective representation of the continuously circulating container conveyor device according to the invention FIG. 2 a perspective representation of some components of the container conveyor device according to FIG. 1 in a $1^{st}$ phase of the transport movement, FIG. 3 a perspective representation of some components of the container conveyor device according to FIG. 1 in a $2^{nd}$ phase of the transport movement, FIG. 4 a perspective representation of some components of the container conveyor device according to FIG. 1 in a $3^{rd}$ phase of the transport movement, FIG. 5 a perspective representation of some components of the container conveyor device according to FIG. 1 in a $4^{th}$ phase of the transport movement, FIG. 6 a perspective representation of some components of the container conveyor device according to FIG. 1 in a $5^{th}$ phase of the transport movement, FIG. 7 an enlarged lateral view of the rotor, and FIG. 8 an enlarged representation of the end region of a container carrier.

FIG. 1 shows a perspective representation of the substantial components of a continuously circulating container conveyor device 10 according to the invention in a packaging machine, in particular a cup filling machine. The container conveyor device 10 has an upper linear conveyor 11, which has two screw conveyors 12 arranged next to each other at a distance and parallel to each other, which run substantially horizontally and in each case are rotary driven around their longitudinal axis, as indicated by arrows $R_1$ in FIG. 1. Each screw conveyor in the represented exemplary embodiment consists of two coaxially arranged screw conveyor parts 12a, which are connected to each other in rotationally fixed manner in a connection region and hence rotate as a unit.

A plurality of plate-shaped container carriers 13 which each possess a plurality of recesses serving as the container receptacle 15 are arranged between the two screw conveyors 12. A corresponding container carrier is also designated as a cell plate.

A rail 17 (see also FIG. 2) runs parallel to each screw conveyor 12 on the side facing the respective other screw conveyor 12. The rails 17 serve the support of the container carrier 13 during its movement within the upper linear conveyor 11. On each the front sides of the container carriers 13 facing the screw conveyors 12, two rollers 16 are arranged spaced apart from each other in transport direction, via which the container carrier 13 is supported on the rails 17 (see FIG. 8).

An additional central rail 18 is arranged in the intermediate space between the two screw conveyors 12, said central rail running parallel to the rails 17 and serving to support the container carrier 13 during its transport within the upper linear conveyor 13 in the central region, by having the container carrier 13 rest upon the central rail 18.

A lower linear conveyor 28 substantially identical in structure is arranged with spacing below the upper linear conveyor 11, said lower linear conveyor likewise having two parallel screw conveyors 29, which are rotary driven, as indicated by the arrows $R_2$. Each screw conveyor 29 in the represented exemplary embodiment consists of two coaxially arranged screw conveyor parts 29a, which are in rotationally fixed manner connected to each other in a connection region and hence rotate as a unit. The lower linear conveyor 28 also has two rails 30 (see FIG. 2), which run parallel to the respective screw conveyor 29. In addition, a central rail 31 supporting the container carrier 13 is provided.

At its front sides of the rollers 16 facing the screw conveyors 12 or 29, the container carrier 13 has an engagement part 14, which is embodied in the form of an engagement roller arranged coaxially to the respective roller 16 (see FIG. 8). The engagement parts 14 can enter into engagement with the screw conveyors 12 or 29 such that a rotation of the screw conveyors 12 or 29 causes a linear displacement of the container carrier 13 along the rails 17 or 30.

A curved conveyor 20 or 34 is respectively provided at the axial ends of the upper linear conveyor 11 or of the lower conveyor 28. The curved conveyors 20 or 34 each have two guide carriers 26, 38, in which in each case a somewhat semi-circular curved guide track 21 or 35 is embodied. The guide track 21 or 35 connects the end of the assigned rail 17 of the upper linear conveyor 11 to the end of the assigned rail 30 of the lower linear conveyor 28.

Further, each curved conveyor 20 or 34 has a rotating drive device 22 or 36. The drive device 22 or 36 comprises a rotary driven shaft 27 or 41, which is rotatable around its longitudinal axis, as indicated by the arrows $R_3$ or $R_4$. Respective rotors 23 or 39 rigidly connected to the shaft 27 or 41 are seated on the shaft 27 or 41 in the region of the guide carriers 26 or 38, respectively. Each rotor 23 or 39 has three rotor arms 24 or 40 (see also FIG. 7) extending radially outward from the shaft 27 or 41, which have a plurality of receptacles 25 or 37 opening radially outward at their radially outer, free ends. The receptacles are adapted in their design to the size of the engaging parts 14 of the container carriers 13, so that engaging parts 14 can be received in the receptacles 25 or 37 with a tight fit.

In the following, on the basis of FIGS. 2 to 6, the transfer of a container carrier 13 from the upper linear conveyor 11 to the curved conveyor 20 and then from the curved conveyor 20 to the lower linear conveyor 28 will be explained. In the position represented in FIG. 2 the container carrier 13 is in the upper linear conveyor 11. By rotating the screw conveyors 12, a linear transport movement of the container carrier 13 along the rails 17 is generated via the engagement of the engagement parts 14 in the screw conveyors 12, wherein the container carrier 13 supports itself on the rails 17 and additionally on the central rail 18 via the rollers 16. The distance of the engagement parts 14 of the container carrier 13 in the conveyor direction is such that in the transport movement along the screw conveyors 12 the available spacing in the connection region 12b between the axially arranged screw conveyor parts 12a is bridged, i.e., in each state of the conveyor movement at least one engagement part 14 is in engagement with one of the screw conveyor parts 12a.

At the end of the linear transport movement the container carrier 13 has reached the end region of the screw conveyors 12 of the upper linear conveyor 11. The movements of the screw conveyors 12 and of the rotors 23 are synchronized such that the receptacles 25 embodied on the free end of the rotor arms 24 enter into engagement from below with the engagement parts 14 of the rollers 16 mounted on the container carrier 13 running in the transport direction. Directly after that (FIG. 3) the engagement parts 14 of the rollers 16 trailing in the transport direction are released from the screw conveyors 12 of the upper linear conveyor 11, so that the further transport movement is generated by the rotors 23. The container carrier 13 now engages with all engagement parts 14 in the receptacles 25 of the rotors 23.

Due to the rotational movement of the rotors 23 the container carrier 13 is moved along the curved guide track 21 (FIG. 4) and in the process swiveled until it reaches the end of the guide tracks 21 and comes to rest at least with its rollers 16 running in the transport direction on the rails 30 of the lower linear conveyor 28, as represented in FIG. 5.

In a further feed movement of the container carrier 13 its engagement parts 14 running in the transport direction engage in screw conveyors 29 of the lower linear conveyor 28.

Simultaneously, the receptacles 25 of the rotors 23 are disengaged from the engagement parts 14 of the container carrier 13 trailing in the transport direction (FIG. 5), so that, as a consequence of the rotational movement of the screw conveyors 29 of the lower linear conveyor 28 said container carrier travels along the rails 30, as represented in FIG. 6, wherein the container carrier 13 also rests upon the central rail 31 of the lower linear conveyor 28.

At the end of the lower linear conveyor 28, in similar manner a transfer and a further transport of the container carrier 13 occur by means of the curved conveyor 34 (see FIG. 1), whereupon the container carrier 13 is again transferred in the mentioned manner to the upper linear conveyor 11.

As FIG. 1 shows, along with the upper linear conveyor 11 a plurality of container carriers 13 is simultaneously transported in a continuous series, wherein two container carriers 13 arranged behind each other in the transport direction either directly abut or are transported at a short distance of preferably less than 30 mm and in particular less than 10 mm. In this way, there is a continuous sequence of container carriers and hence containers arranged in the container carriers, which during the transport along the upper linear conveyors 11 pass through various work stations and in particular are filled and sealed.

It is assumed that in their transport along the upper linear conveyors 11 between the two curved conveyors 20 and 34 the container carriers 13 are transported at an average speed $V_o$. In principle, it would be possible to also transport the container carriers at the same speed in their transport along the lower linear conveyors 28. This would result in a continuous series of container carriers 13 also having to be provided along the lower linear conveyors in order to ensure that a container carrier 13 is always available at the beginning of the transport track of the upper linear conveyors 11. Since this would make a great number of container carriers 13 necessary, provision is made that in their transport along the lower linear conveyors 28 the container carriers 13 are transported at an average speed $V_u$, which is substantially greater than the speed $V_o$. In particular, provision can be made that $V_u \geq 1.5\ V_o$. In particular, $V_u \geq 2.5\ V_o$, or also $V_u \geq 3\ V_o$. As a result, fewer container carriers 13 are necessary, as indicated in FIG. 1.

The invention claimed is:

1. A continuously circulating container conveyor device in a packaging machine comprising:
at least a plurality of plate-shaped container carriers having a plurality of container receptacles,
at least two linear conveyors arranged above one another, each one of said linear conveyors comprising two rotary driven screw conveyors arranged at a distance parallel next to each other, at least one of the container carriers being arranged to bridge the distance between the screw conveyors and carrying at least one engagement part on respective front sides respectively facing the screw conveyors, said engagement part being adapted to engage between windings of the screw conveyors for transferring a drive movement,
at least two curved conveyors, each curved conveyor having a curved guide track and a rotating drive device having at least one engagement receptacle adapted to be brought into engagement with the container carriers,
the curved conveyors being arranged in transport direction between the two linear conveyors at respective ends of said linear conveyors, so that each linear conveyor is followed by one of the curved conveyor in the transport direction, wherein at the end of the screw conveyors the container carriers can be disengaged from them and can be brought into engagement with the rotating drive device of the following curved conveyor, wherein the linear conveyors and the curved conveyors form a circulating transport track,
the plurality of container carriers being configured to be transported along the upper linear conveyor in a series with a mutual 1$^{st}$ spacing of less than 30 mm and at an average speed $V_o$ and to be transported along the lower linear conveyor with a mutual 2$^{nd}$ spacing, at an average speed $V_u$, the 2$^{nd}$ spacing being greater than the 1$^{st}$ spacing, and the speed $V_u$ being greater than the speed $V_o$ with $V_u \geq 1.5\ V_o$.

2. The container conveyor device according to claim 1, wherein $V_u \geq 2.5\ V_o$.

3. The container conveyor device according to claim 2, wherein a rail is assigned to each screw conveyor, upon which rail the container carriers can be moved.

4. The container conveyor device according to claim 3, wherein at least one of the container carriers has a plurality of rollers on the front sides respectively facing the screw conveyors, said rollers on each front side being spaced apart in the transport direction, the at least one of the container carriers being supported on the rails with said plurality of rollers.

5. The container conveyor device according to claim 4, wherein one of the engagement parts is mounted on a side of the respective rollers averted from the container carrier.

6. The container conveyor device according to claim 1, wherein the 1$^{st}$ spacing is less than 10 mm.

7. The container conveyor device according to claim 1, wherein at least one of the screw conveyors is formed from a plurality of screw conveyors parts arranged axially behind one another, said screw conveyor parts being connected to one another in rotationally fixed manner.

8. The container conveyor device according to claim 1, wherein at least one of the curved conveyor has two guide carriers arranged at a distance next to each other, a guide track being provided at each guide carrier.

9. The container conveyor device according to claim 1, wherein the rotating drive device of at least one of the curved conveyor has two rotary driven rotors arranged at a distance next to each other, each of said rotor having several rotor arms arranged distributed over a circumference.

10. The container conveyor device according to claim 9, wherein at least one of the engagement receptacles is arranged on each of the rotor arms.

11. The container conveyor device according to claim 10, wherein the at least one of the engagement receptacles is arranged on a radially outer free end of the respective rotor arm.

12. The container conveyor device according to claim 1, wherein at least one of the engagement receptacles can be brought into engagement with the engagement parts of the container carriers.

13. The container conveyor device according to claim 1, wherein the screw conveyors of the respective linear conveyors are substantially structurally identical and the screw conveyors of the lower linear conveyors are driven at a higher speed than the screw conveyors of the upper linear conveyors.

14. A packaging machine comprising a continuously circulating container conveyor device according to claim 1.

15. A cup filling machine comprising a continuously circulating container conveyor device according to claim 1.

* * * * *